Oct. 19, 1954　　D. G. STÅLHANDSKE ET AL　　2,692,045
FULLY AUTOMATIC MACHINE AS WELL AS GAUGE
FOR MULTIDIMENSIONAL TOLERANCE MEASURING
AND SORTING OF WORKPIECES
Filed Feb. 17, 1949　　　　　　　　　　　　　13 Sheets-Sheet 1
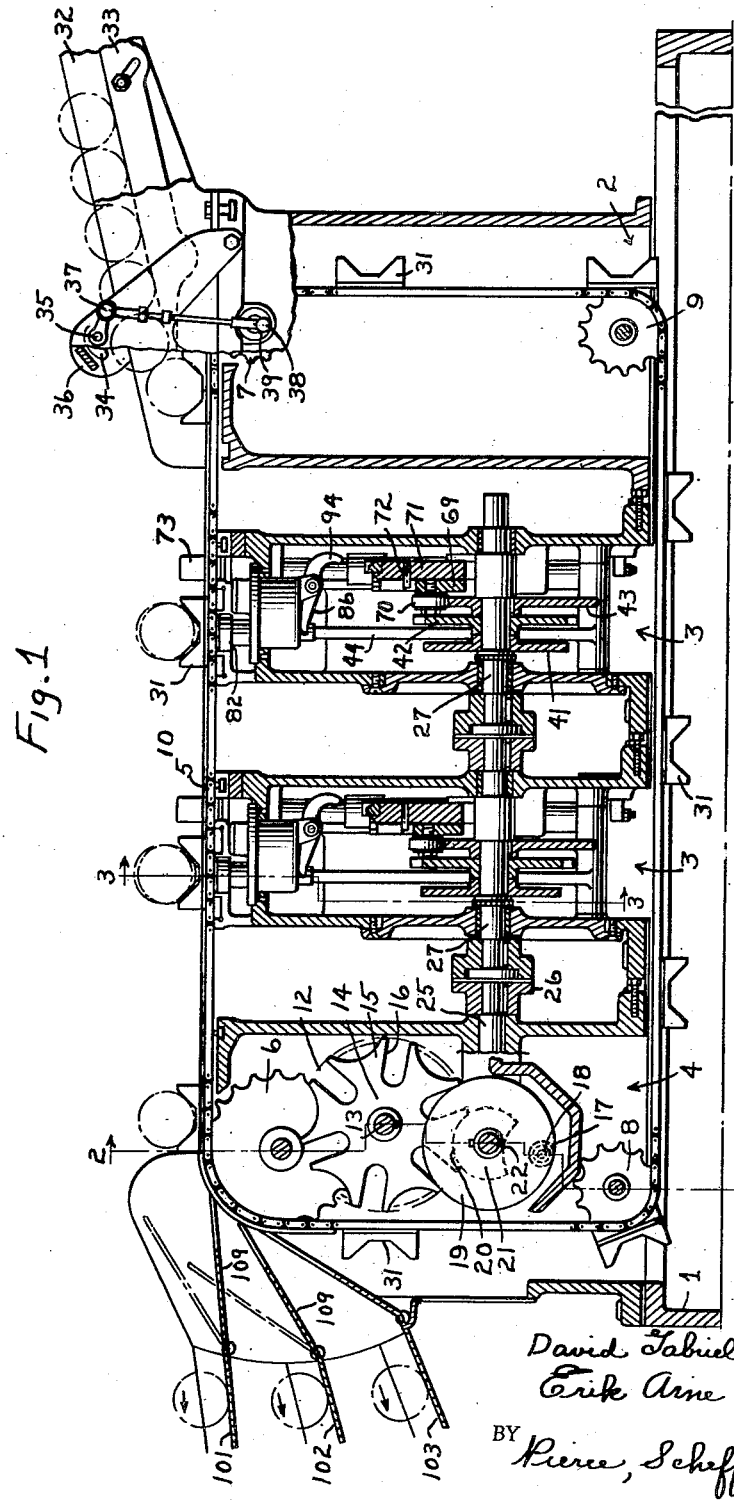
INVENTORS
David Gabriel Stålhandske
Erik Arne Johnson
BY Pierce, Scheffler & Parker
ATTORNEYS

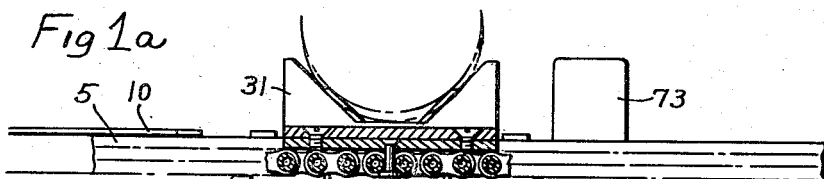
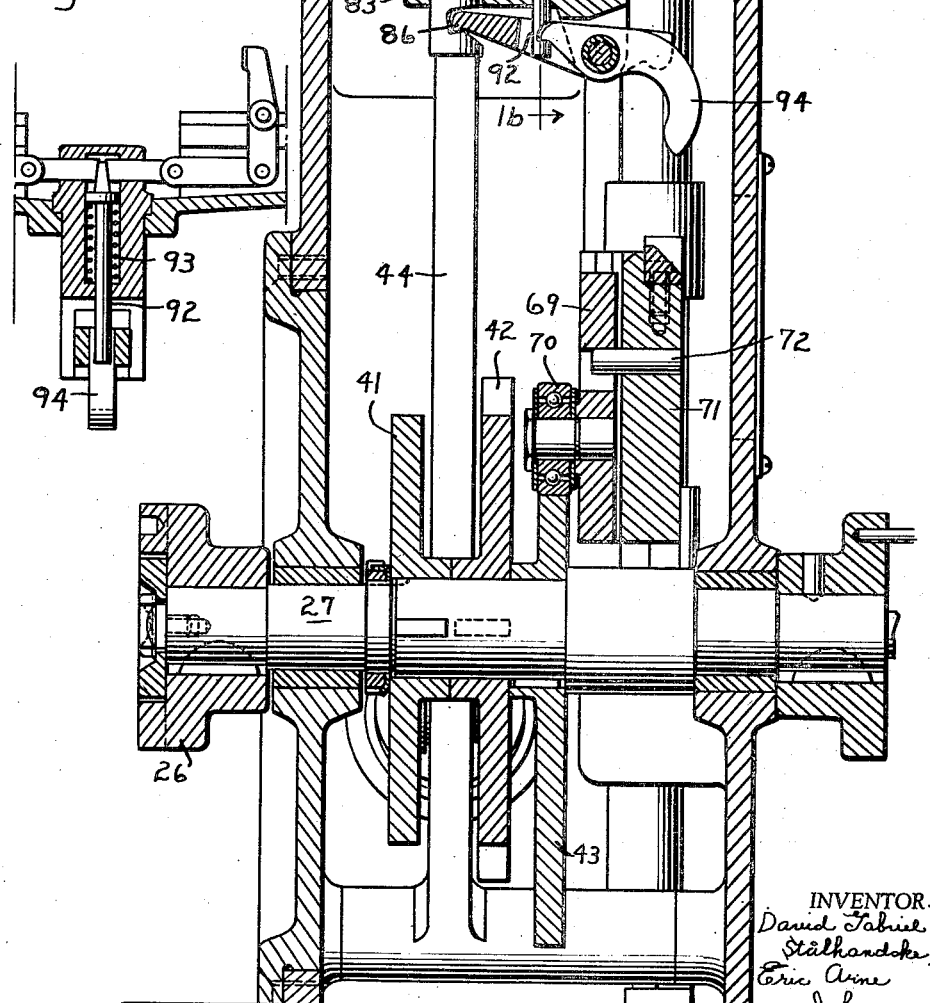

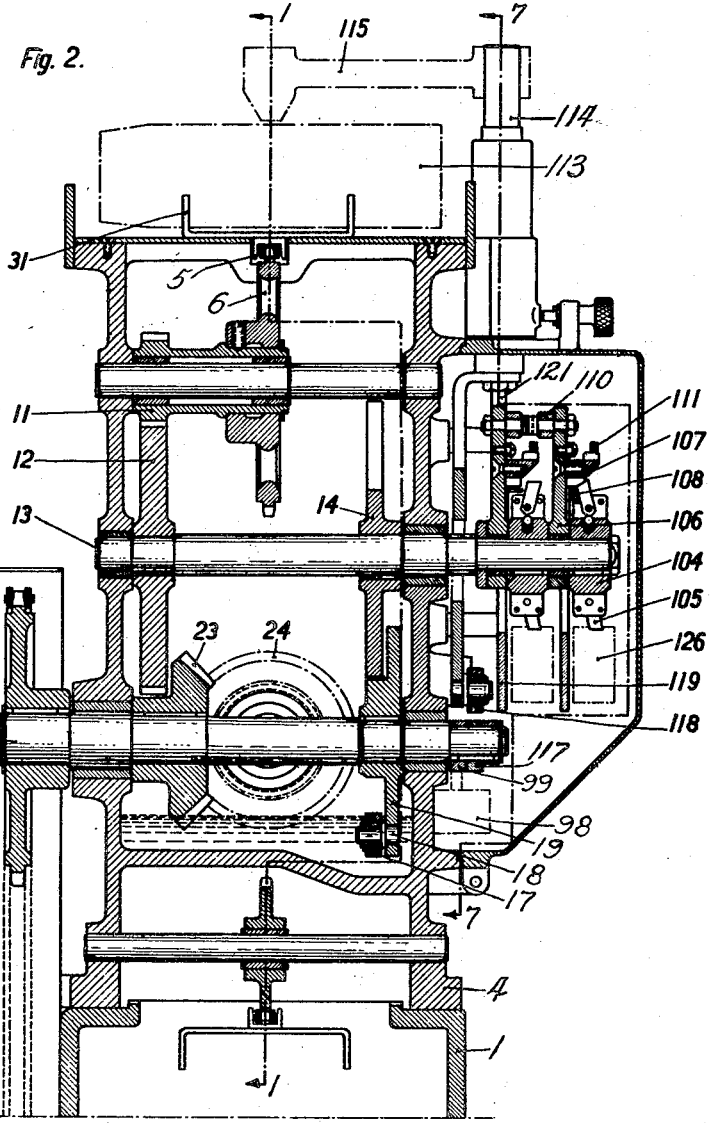

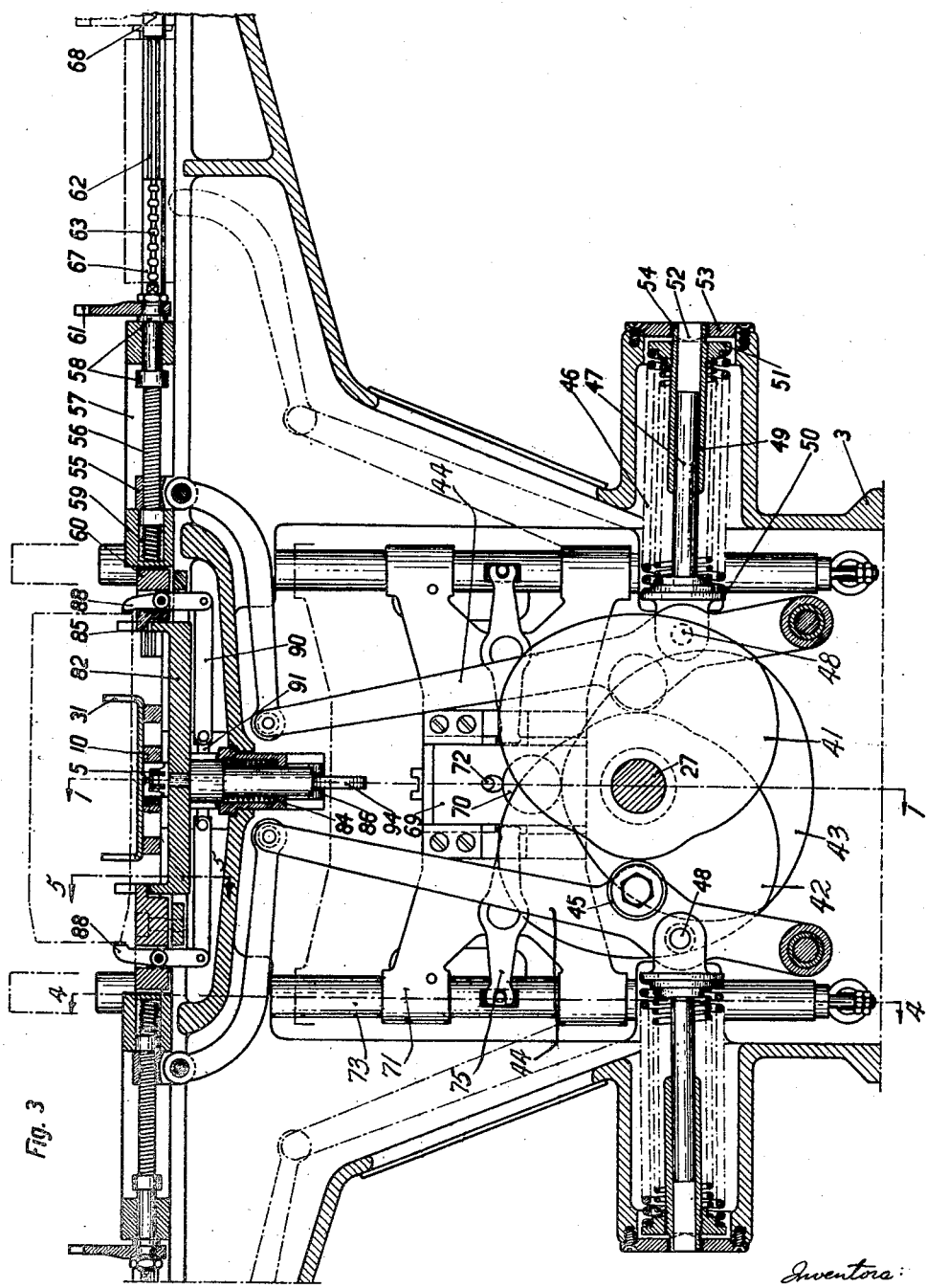

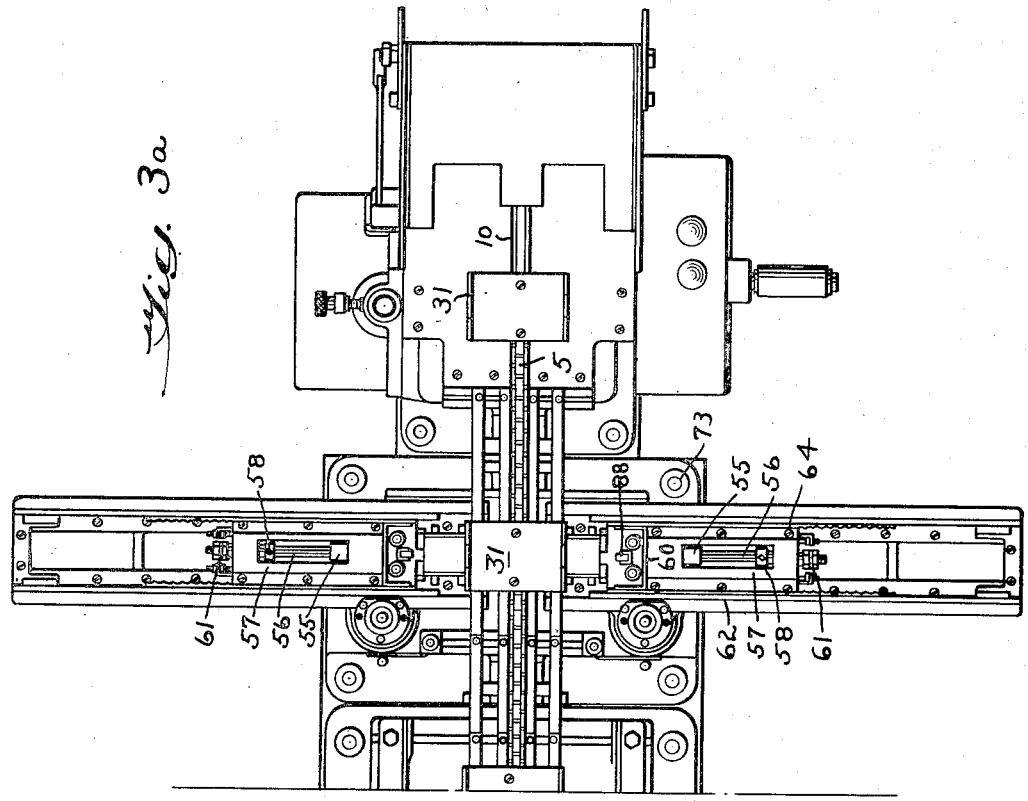
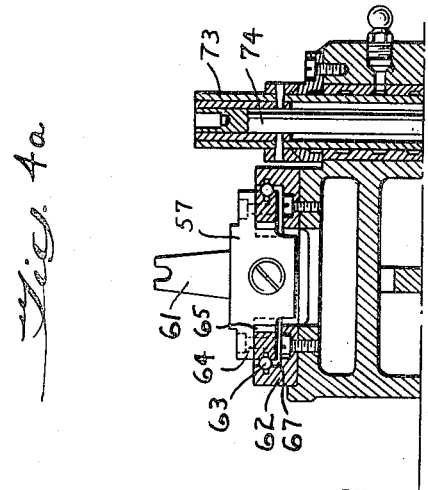

Oct. 19, 1954  D. G. STÅLHANDSKE ET AL  2,692,045
FULLY AUTOMATIC MACHINE AS WELL AS GAUGE
FOR MULTIDIMENSIONAL TOLERANCE MEASURING
AND SORTING OF WORKPIECES
Filed Feb. 17, 1949  13 Sheets-Sheet 6
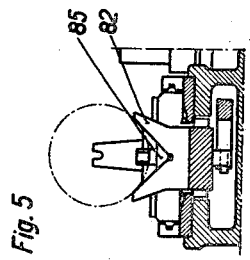
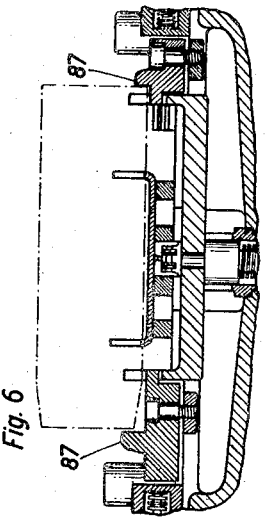
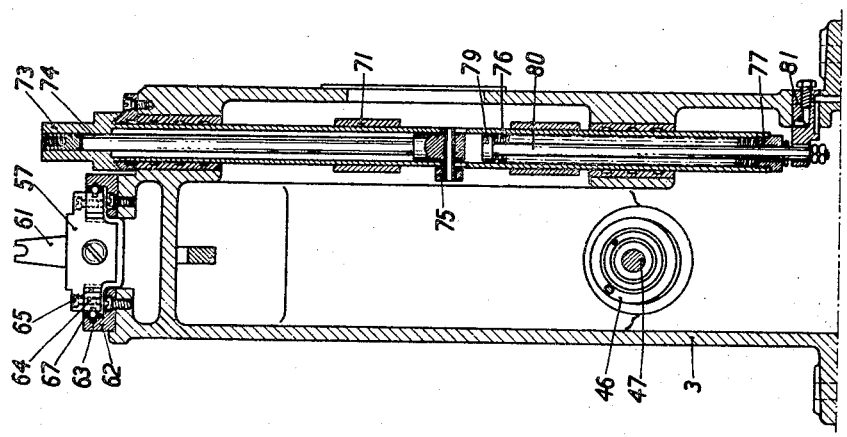

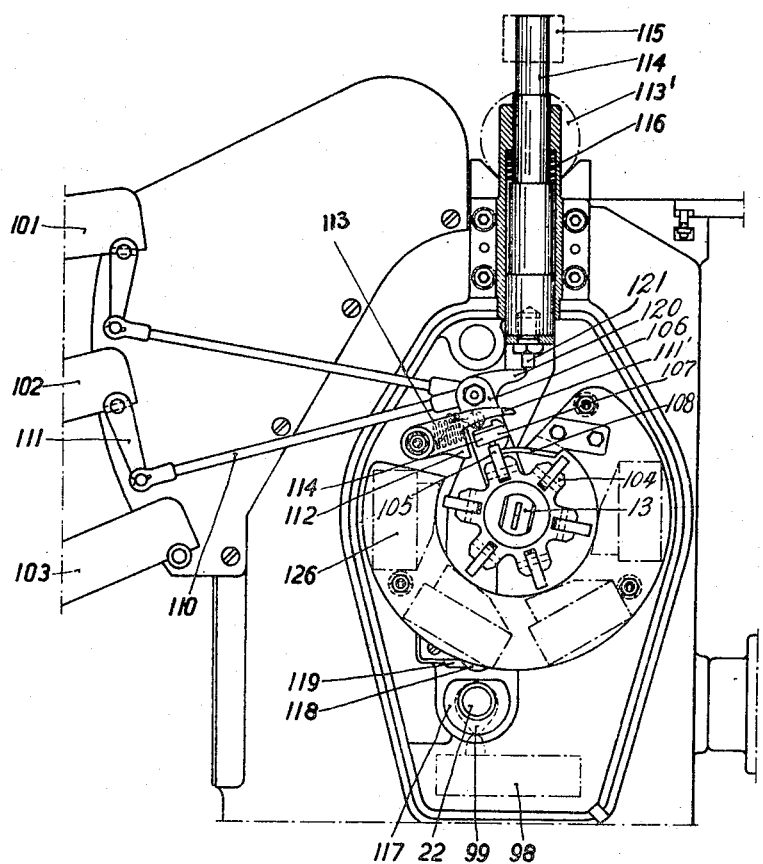

Oct. 19, 1954

D. G. STÅLHANDSKE ET AL 2,692,045

FULLY AUTOMATIC MACHINE AS WELL AS GAUGE
FOR MULTIDIMENSIONAL TOLERANCE MEASURING
AND SORTING OF WORKPIECES

Filed Feb. 17, 1949

Inventors:
David G. Stålhandske and
Erik A. Johnson,
By: Pierce, Scheffler & Parker,
Attorneys.

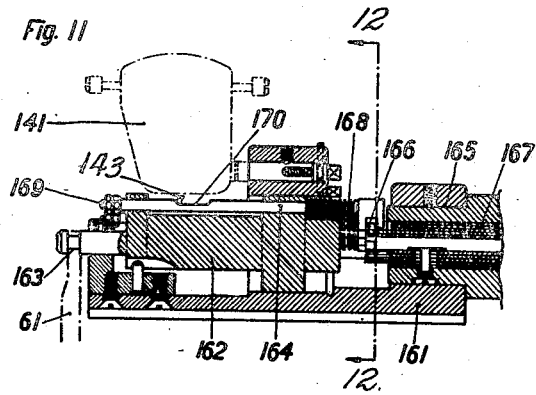
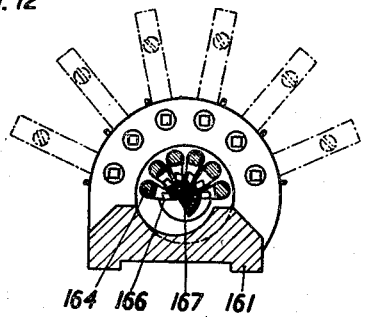
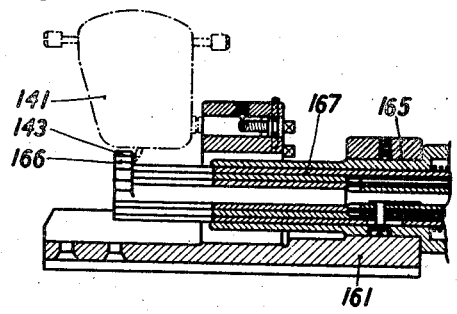

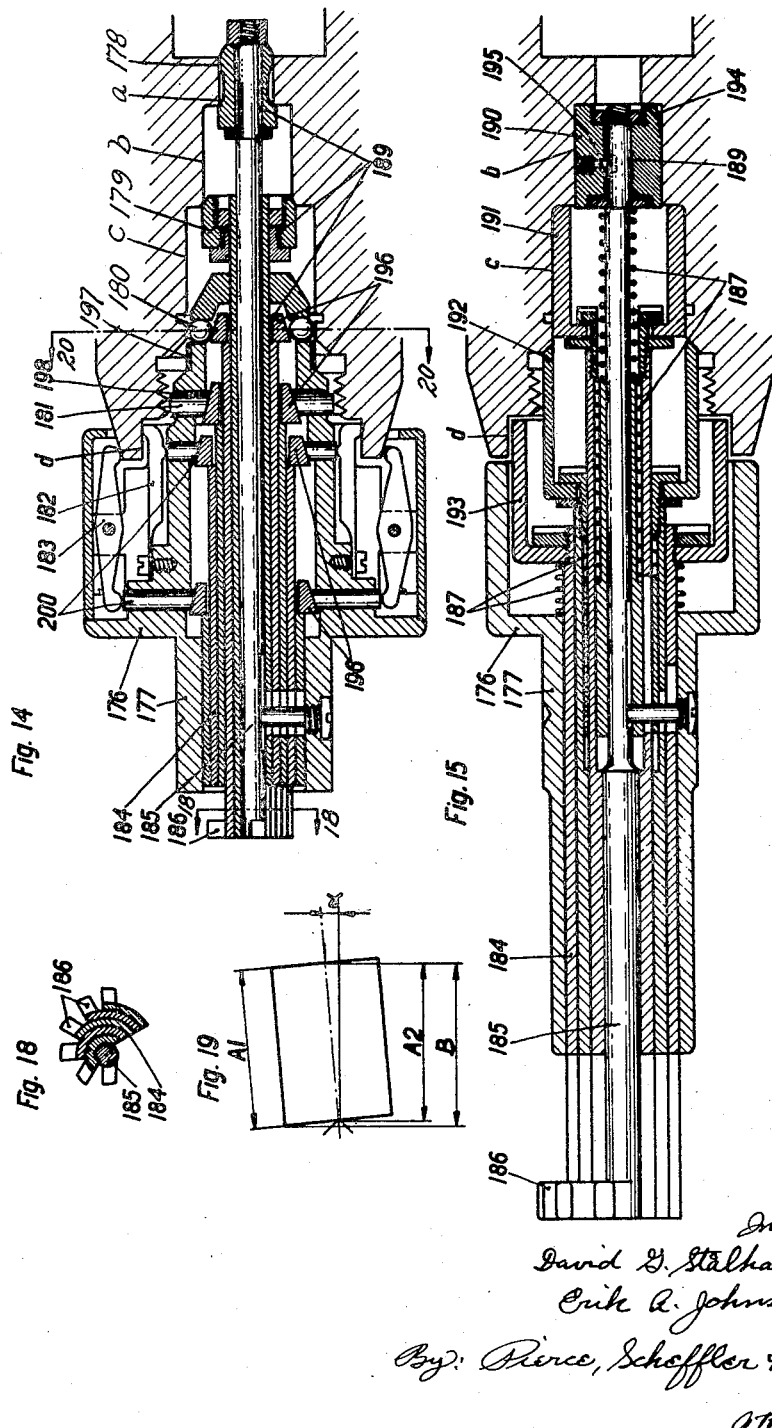

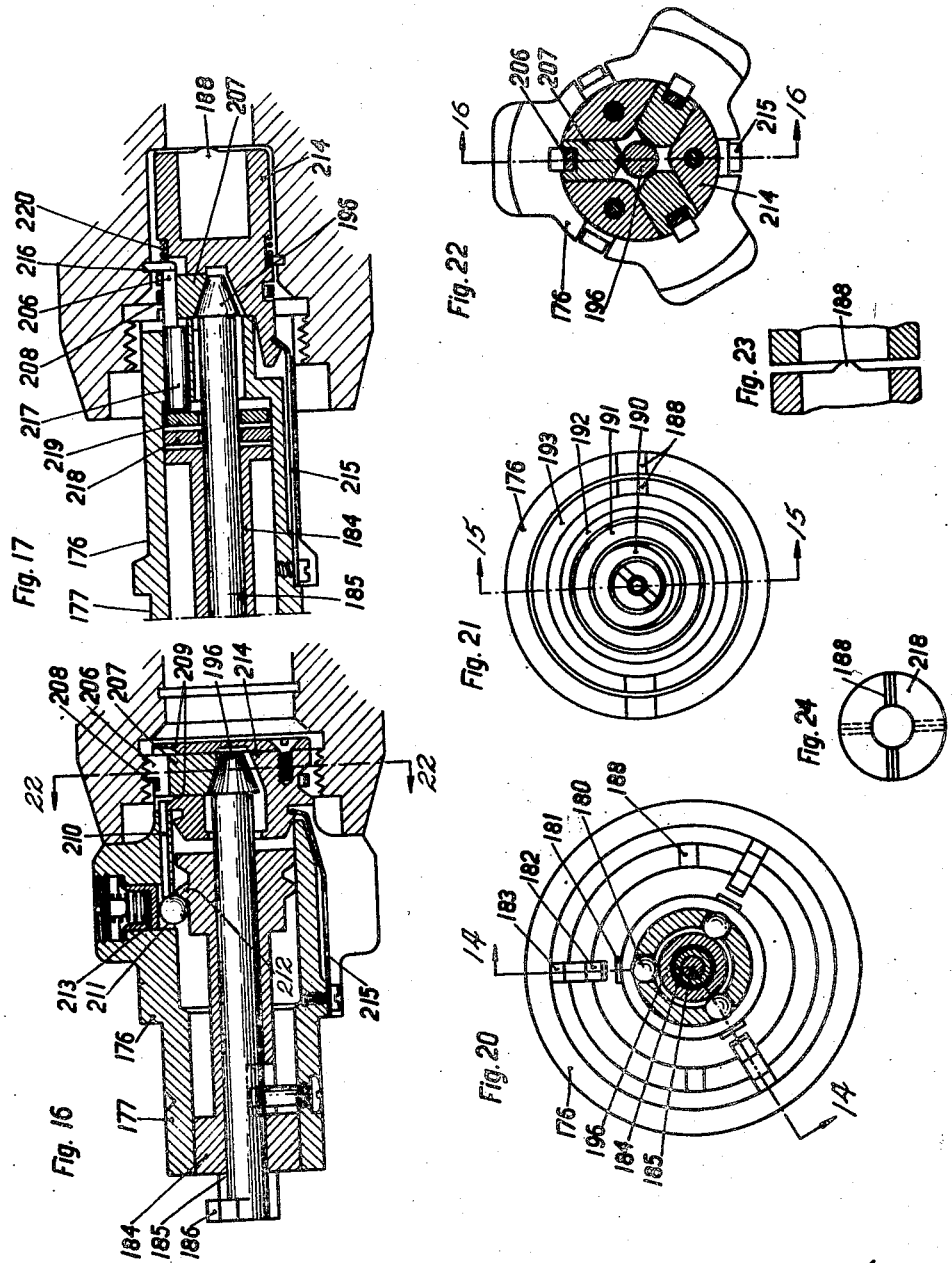

Oct. 19, 1954
D. G. STÅLHANDSKE ET AL
2,692,045
FULLY AUTOMATIC MACHINE AS WELL AS GAUGE
FOR MULTIDIMENSIONAL TOLERANCE MEASURING
AND SORTING OF WORKPIECES
Filed Feb. 17, 1949
13 Sheets-Sheet 12
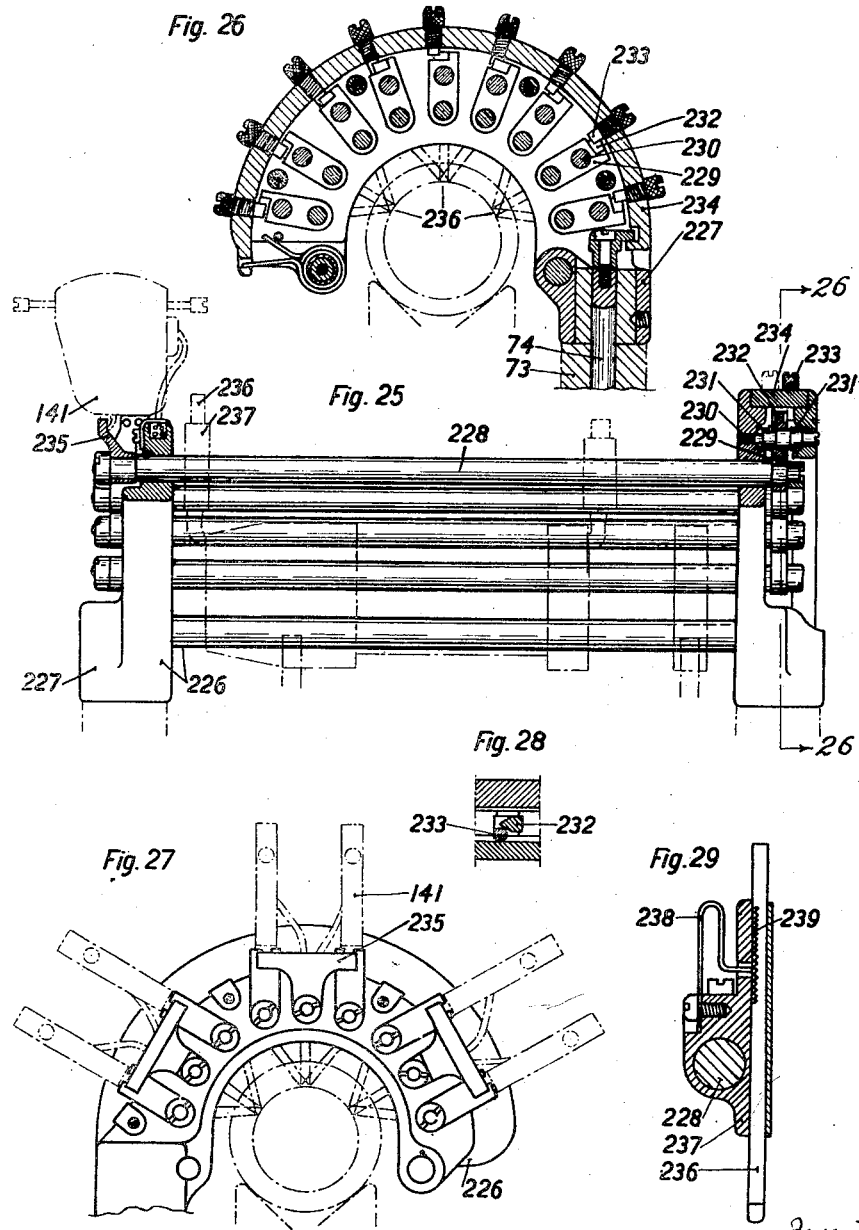

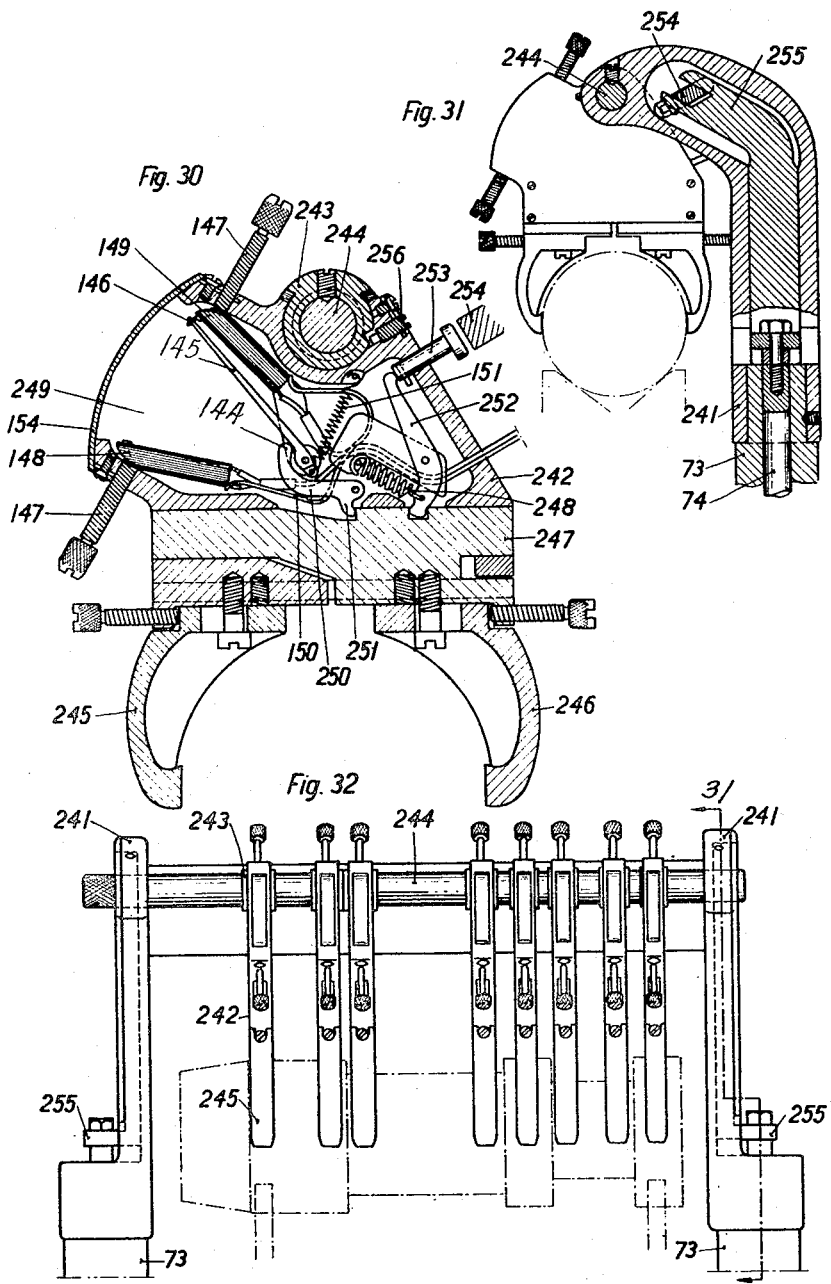

Patented Oct. 19, 1954

2,692,045

UNITED STATES PATENT OFFICE 2,692,045

FULLY AUTOMATIC MACHINE AS WELL AS GAUGES FOR MULTIDIMENSIONAL TOLERANCE MEASURING AND SORTING OF WORKPIECES

David G. Stålhandske and Erik A. Johnson, Bofors, Sweden

Application February 17, 1949, Serial No. 76,894

11 Claims. (Cl. 209—88)

The present invention relates to a fully automatic machine for tolerance measuring and sorting of work pieces of complicated shape, internally as well as externally (preferably of the kind manufactured in automatic lathes, but may also be used for work pieces of other kinds), as well as measuring means and gauges for this or any other machine or apparatus intended for multidimensional measurement.

The chief purpose of the invention is to create a machine which automatically, rapidly and precisely controls and sorts complicated details, the manufacture of which is done on a large scale, as well as measuring means and gauges making such a measurement possible, and thus to reduce the costs caused by such a control, and also to permit a re-setting of the machine at the smallest possible time and costs when it is desired to control some other detail in same, i. e. the greatest possible universality.

As will be known, the most ordinary control method is manual gauging by means of fixed gauges, i. e. measuring bodies such as gauges, rings, caliper gauges or form templets, corresponding to the highest and the lowest limit respectively of the dimension to be controlled. For simpler mass-products there are often used gauges having indicators or lamps marking the limits. As reading as well as sorting is manually effected and the work is monotone, errors will easily arise, and therefore this method is not satisfactory.

The machine according to the present invention is mainly characterized in that an adequate number (up to four in the embodiment shown) of measuring stations may be mounted, which stations in respect of principal parts are of a similar kind and through which the work pieces are fed stepwise for afterwards being sorted; and furthermore in that a number of movable measuring members, according to the shape of the work piece and the space conditioned by same, are mounted on each measuring station, whereby internal as well as external diameters, length, depth, width and distance measures, etc., may be controlled, so that, when the work piece has passed through the measuring stations, all tolerance measures have been controlled. Thus, the number of details measured per time unit will be constant, no matter how many measures are controlled, and will consequently correspond to the time needed for one measuring operation if the machine shall work satisfactorily.

Each measuring station (or measuring unit) comprises a device for receiving or carrying the work piece during the measuring and a number of slides, guides or the like with pertinent driving means, on which are mounted the measuring members adapted to the shape of the work piece and the dimensions to be controlled in the respective station. The driving means and the respective slides or guides are so arranged that, besides the main movement, also a secondary movement may be imparted to the measuring members mounted thereon, whereby it is made possible to measure surfaces paralleling the direction of the main movement without necessitating that the respective measuring pistons or shoulders are dragging (gliding) along the surface to be measured, and also to measure such surfaces which it would otherwise be impossible to measure on account of the shape of the work piece.

The measuring members which are mounted on the respective slides or guides may be adapted either as universal (settable) devices for a certain category of measures, for instance "measuring means for external diameters" for external diameter-measures, "measuring means for external lengths" for external length-measures, groove widths, flange thicknesses and distance measures, or as a universal device provided with special gauges dimensioned in accordance with the work piece, for instance "measuring means for interiors," by which internal diameter, depth and distance measures are controlled. In these special gauges, however, certain parts may be made universal.

These measuring means comprise a body or the like carrying and guiding the different movable measuring jaws and pistons respectively, and a mechanism which distributes and by means of springs transmits the measuring motion from the driving mechanism, whereby a constant, individual measuring pressure is obtained on each surface to be measured, as well as electrical contact means which close a circuit when the respective measures exceed the tolerance limits.

Through the current impulses received from the measuring contacts, a locking mechanism in the sorting unit is actuated by means of electromagnets, the said locking mechanism thus registering for each station if any measure lies beyond the tolerance limits, and when the work piece has passed all measuring stations, this locking mechanism actuates a sorting device through which the work piece falls out in the duct or the partition which corresponds to the defect it is beset with, independently of other work pieces at the same time being measured in the other stations.

The work pieces are sorted in the categories accepted, adjustable and cancelled, but the machine may also be adapted for a further division of the faulty work pieces.

The machine may furthermore be provided with means for marking the accepted work pieces as well as with Comptometer and fault-checking board indicating the different faults of the work pieces.

The drawings show embodiments according to the invention.

Fig. 1 is a view of the improved gauging and sorting machine in vertical longitudinal section on line 1—1 of Figs. 2 and 3;

Fig. 1a is an enlarged view in vertical section of the structural detail shown in Fig. 1 at one of the measuring stations.

Fig. 1b is a vertical section on line 1b—1b of Fig. 1a.

Fig. 2 is an enlarged view in vertical transverse section of the sorting station on line 2—2 of Fig. 1;

Fig. 3 is an enlarged view in vertical transverse section of one of the gauging stations on line 3—3 of Fig. 1;

Fig. 3a is a view in top plan of one of the gauging stations;

Figs. 4 and 4a are vertical longitudinal sections taken on line 4—4 of Fig. 3;

Fig. 5 is a view in vertical longitudinal section taken on line 5—5 of Fig. 3;

Fig. 6 is a fragmentary detail of the sorting station illustrated in Fig. 3;

Fig. 7 is a view in vertical longitudinal section of the sorting station taken on line 7—7 of Fig. 2;

Fig. 11 is a fragmentary view in vertical longitudinal section of a typical multiple measurement plug gauge for gauging internal dimensions;

Fig. 12 is a vertical transverse section on line 12—12 of Fig. 11;

Fig. 13 is a view similar to Fig. 11 showing a modified type of gauge mounting;

Fig. 14 is a view in vertical longitudinal section on line 14—14 of Fig. 20 showing a modification of a multiple measurement plug gauge for gauging internal dimensions;

Fig. 15 is a view in vertical longitudinal section on line 15—15 of Fig. 21 showing another modified construction for a multiple measurement type plug gauge;

Fig. 16 is a view in vertical longitudinal section on line 16—16 of Fig. 22 showing still another type of multiple measurement plug gauge;

Fig. 17 is a view in vertical longitudinal section illustrating a further modified construction for a multiple measurement type plug gauge;

Fig. 18 is a vertical transverse section on line 18—18 of Fig. 14;

Fig. 19 is a diagrammatic view related to explanation of the operation of the plug gauges;

Fig. 20 is a vertical transverse section on line 20—20 of Fig. 14;

Fig. 21 is an end view of the gauge shown in Fig. 15;

Fig. 22 is a vertical transverse section on line 22—22 of Fig. 16;

Figs. 23, 24 show details of the plug gauges;

Fig. 25 is a vertical longitudinal section of a multiple measurement gauge for gauging external lengths;

Fig. 26 is a vertical transverse section on line 26—26 of Fig. 25;

Fig. 27 is an end view of a modified construction for a multiple measurement type gauge for gauging external lengths;

Figs. 28, 29 are sectional details of the gauge shown in Figs. 25, 26;

Fig. 30 is a vertical transverse section of a multiple measurement type of gauge for gauging external diameters;

Fig. 31 is a transverse view on line 31—31 of Fig. 32; and

Fig. 32 is a view in longitudinal elevation of the gauge, the details of which are shown in Figs. 30 and 31.

*Feeding mechanism*

Figure 10:
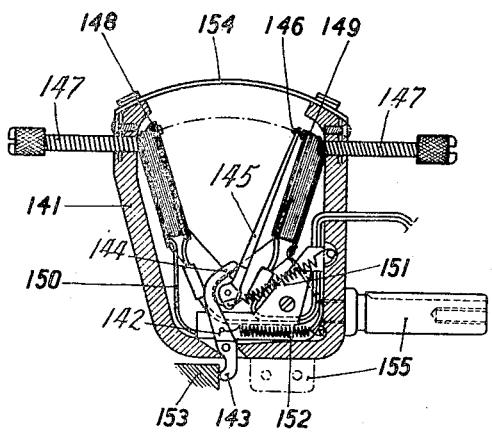
Fig. 10 is a view of one of the electrical contact devices used in combination with any of the various types of gauges.

The machine shown on the drawing, Fig. 1, consists of a foundation or frame 1, on which a feed device 2, one or more measuring units 3 and sorting means 4 are mounted in sequence. An endless chain 5 is passing through these parts, the said chain being carried by chain wheels 6, 7, 8, 9, journalled in the feed and the sorting device in an appropriate way, and also by guide bars 10 or the like located between the measuring units, and the sorting means respectively. Figs. 1 and 2 show that the chain wheel 6 is driven for instance via toothed wheels 11 and 12 by a star wheel mechanism. This mechanism, Fig. 1, comprises a disc 14 journalled on a shaft 13, said disc being provided with radially projecting parts 15 between which are radial grooves 16. A pin 18 on a wheel 19, provided with a roller 17, is arranged to engage said grooves, and when this engagement takes place, the wheel 14 is caused to turn. The parts 20 on the star wheel 14 between the projections 15 have concave edges and are arranged to co-operate with an arch-shaped part 21 on the wheel 19 so that the star wheel 14, when not turned by the wheel 19, is retained through the engagement with the said arch-shaped part 21.

The wheel 19, Fig. 2, is fixed on a shaft 22 which is driven at a uniform speed during the entire operation of the machine. On the shaft 22 is furthermore fixed a bevel gear 23 which co-operates with a (equally large) bevel gear 24 on a shaft 25, Fig. 1, and transmits the drive via a shaft gear 26 to the driving shafts 27 of the measuring unit.

A number of V-shaped blocks 31, carriers or the like are fastened on the chain 5 in an appropriate manner and with uniform pitch, and arranged so as to carry or hold the work piece during the transport to the sorting means.

*Feed device*

The feed device, Fig. 1, consists of a frame or casing 2, on which settably arranged plates or bars 32, 33 are located, the work pieces being placed on same until they by the machine are automatically fed in by means of a settable locking mechanism consisting of for instance locking pieces 34 secured to a shaft 35 which is carried by a loop 36 settably fixed to the frame 2. The shaft 35 is actuated by for instance a link 37 connected with a crank pin 38 on a shaft 39, which is driven by the chain wheel 7 when the chain 5 is running.

Measuring unit

The measuring units, Fig. 1 and Figs. 3–6, which in respect of number may be adjusted to the nature of the work piece and the construction of the gauges through displacing the feed or the sorting device and extending, and shortening respectively, the conveyor chain 5, consist of a frame or casing, on which one or more measuring members, movable in different directions, are acting, and a device for placing or fixing the work piece with a view to certain surfaces. As the machine shown is primarily intended for so-called automation details, i. e. work pieces made in automatic lathes and the surfaces of which are consequently composed of different cylindrical or conical surfaces (rotation surfaces), internally as well as externally, but having a common axis, each unit (or station) of the embodiment shown consists of three independent measuring members, two of them (with positions displaced 180° relatively each other) having their main movement in the horizontal plane (at a right angle to the conveyor chain) and being intended primarily for internal feeding, one member measuring from one end of the work piece and the other from the opposite end, while the third measuring member has its main movement in the vertical plane (from above), measuring external surfaces.

Figs. 1 and 3–6 show the measuring units without the special gauges and means which are adjusted to the dimensions to be measured in the respective stations, but with the slides or guides on which the different gauges are placed, as well as the members giving these slides or guides the necessary motion.

The horizontal motion of the measuring units

Each measuring unit, Fig. 3, consists of a frame or casing 3, in which the driving shaft 27 is journalled and on which three curve discs 41, 42, 43 are fixed. Two of these actuate arms 44 journalled in the frame and provided with rollers 45 which are pressed against the curve discs by springs 46, said springs being arranged for this purpose in a suitable way, for instance through a piston 47 one end of which is connected with the respective arm 44 by means of a pin 48, and the other end of which is displaceably journalled in a sleeve 49, so that the spring is clamped between the piston flange 50 and the sleeve flange 51, which by means of an edge 52 presses against a cover 53 fastened in the frame 3 and is guided in this by the sleeve part 54. The arms 44 are at their upper ends connected with a nut 55, which by means of a screw 56 is settable in the longitudinal direction of a slide 57. The screw 56 is mounted in the horizontally movable slide 57 and is permitted a certain axial movement relatively the slide, controlled by stop flanges 58. By means of a spring 59 the screw is kept in the rear position (to the right) except when the slide (with the gauges placed on same) has reached the measuring position at which moment the movement of the slide is checked, either thereby that the slide strikes against an abutment 60 secured to the frame, or thereby that the gauges mounted on the slide strike against the work piece when this is in the measuring position, the screw 56 being pushed forwards in its position relatively the slide because the spring action on the arm 44 is greater than the spring action on the screw 56 in the opposite direction. An arm 61 is fixed on the screw 56, which arm transmits the secondary movement obtained to the gauges mounted on the slide in cases when the form of the work piece or the nature of the gauging necessitates such a movement.

The slide 57 is carried and guided for instance by guide rails 62 which are provided on the frame 3 and by balls 63 provided between the slide and the rails, whereby the least possible friction is obtained without lash. Guides 64 mounted on the slide may furthermore be made settable by means of wedges 65 and set screws 66 (not shown) so that an appropriate bearing pressure is obtained. For the support of the balls when these at the movement of the slide have passed beyond the ends of the guides, there is between the guide rails 62 and the guides 64 provided a ball race 67 having the openings for the balls facing the guide rail 62. In order to prevent a successive displacement of the balls in one way or other along their direction of movement, stops 60, 68 are mounted on the frame, against which stops the ball race in such cases will strike, and thus the position of the balls and the ball race will be controlled when the slide 57 reaches its extreme position.

The vertical motion of the measuring units

The driving member for the vertically movable measuring member, Figs. 1 and 3–4 is in respect of main principle like the members described in connection with horizontally movable measuring members but has in the machine shown of course got another constructional form with respect to details, both in consideration of its location relatively the work piece and the conveyor chain and due to the fact that there is no need for exchanging the so-called primary movement, as has been done for the horizontal members, in order to obtain a greater movement than allowed by the curve discs at suitable dimensions thereof.

Thus, the curve disc 43 actuates a slide 69 by means of a roller 70 journalled on the slide. The slide 69 is displaceably journalled in a frame 71, and the movement relatively the frame is limited to a certain size by a shoulder or pin 72, whereby a movement is imparted also to the frame 71, the size of which movement is defined by the curve 43. The frame 71 is rigidly connected with guides 73, which are vertically displaceably journalled in the frame 3, Fig. 4, and the upper ends of which are so adapted that suitable gauges may be fixed thereon, according to the work piece and the nature of the measurement in question. The secondary movement needed for the gauges is, by way of example, obtained by means of rods 74, displaceably journalled in the guides 73 and connected with the slide 69 by arms 75 journalled on the frame 71. As this movable system operates vertically, it is pressed down against the curve disc via the roller 70 by its own weight, but if a greater force is desired, this is obtained through inserting a spring 76 in each guide 73, the lower end of said spring pressing against the bottom 77 of the guide tube and its upper end pressing against a flange 79 on a piston rod 80 which has its lower end locked in the frame by a displaceable latch bolt 81.

Carrying device of the measuring units

As the conveyor chain and its block or carrier for the work piece do not give the work piece a sufficiently precise position during the gauging with respect to the advancing and insertion of the gauges in their gauging position, the machine is fitted with special means to this end. Figs. 1, 1a, 3 and 5 show by way of example how these means are adapted for cylindrical work pieces. Immediately beneath the conveyor chain 5 with its conveyor block or carrier 31 a V-shaped bed 82, adapted to fit the work piece and movable in vertical direction is, as shown most clearly in Fig. 1a, journalled in a bearing housing 83 fixed in the frame and is pressed upwards by a spring 84, the power of which is greater than the weight of the work piece. The upwards movement of the carrying block is, as shown most clearly in Fig. 1a, limited by wedge-shaped abutments 85, while its downwards movement is effected by an arm 86 turnably journalled in the bearing housing 83 and actuated by the frame 71 when this comes near its top position, or by a special cam device arranged on the shaft 27. Through this device the longitudinal axis of the work piece comes in exact position as regards side direction, while an inferior inclination is obtained corresponding to the tolerance for the diameter or diameters of the work piece relatively the carrying block upon which same is placed, for which reason regard must be taken hereto at the adaptation and placing of the abutment surfaces of the gauges, so that the allowed tolerance for measuring of faults is not exceeded, but if required, the machine may be provided with a centering device (not shown in the drawing) through which this inclination is eliminated.

The fixing of the work piece in longitudinal direction is effected either by rigid shoulders 87 according to Fig. 6, between which the work piece is advanced, a certain margin exceeding the maximum measure needed between the work piece and the shoulders, or one or both shoulders are made movable as shown in Fig. 3, whereby a more exact position in the longitudinal direction is obtained, which is advantageous in certain cases of gauging when the gauges cannot be moved so far as is otherwise required. This device consists of one or two jaws 88, turnably journalled in a mounting, or in two mountings respectively 60, and by means of rods 90 articulatedly connected with pistons 91 acting against each other, between the oblique planes of which a wedge-shaped piston 92, Fig. 1, is pressed by means of a spring 93, while the movement of the last mentioned piston in the opposite direction is effected by one end of an arm 94 acting on the piston in the opposite direction, said arm being turnably journalled in the bearing housing 83, and the other end of said arm being actuated by the frame 71 when this approaches its top position.

Central switch

In order that the contact arms in the different gauging devices shall not close the current before they have occupied a position corresponding to the respective dimensions of the work piece, the machine is provided with a central switch device 98, Figs. 2 and 7, which keeps the circuit to all gauge contacts disconnected, except when the contact arms are in measuring position. This contact device is actuated for instance by a curve disc 99 on one of the driven shafts of the machine, by way of example the shaft 22 (and is of known construction as regards form).

The sorting means

Figs. 2 and 7 show the device which, after the work pieces have passed all measuring stations, transmits them to the chute or partition corresponding to the category under which they are to be classified on basis of the measurements done. As the predominant number of work pieces must normally be supposed to fall under the category "accepted," this device is made so that when the work pieces belong to this category, they will be discharged into the corresponding chute 101 without the aid of any special mechanism for this purpose, which is also in accordance with the fact that the electrical contact means of the measuring devices are made so that an electrical impulse arises only when a dimension exceeds the tolerance limits. Thus, with exception for the category "accepted," a mechanism is needed for each category in which a sorting of the work pieces is desirable, while separating of the different faults (dimension limits) in these categories is effected through connecting the corresponding gauge contact to the respective mechanism. The machine shown is made with two such mechanisms.

Each sorting mechanism consists of a hub 104 or the like secured to a shaft driven by the machine, preferably the shaft 13 driven by the star wheel mechanism, which shaft (in this case) turns one-sixth revolution for each measuring operation, i. e., less than one revolution (prescribed condition) during the time needed for passing the work piece through the maximum number of measuring stations connectable, in the shown machine a number of four. Six driver teeth 105 (i. e. the inversely proportional number relatively the proportions of the number of revolution) are movably journalled along the circumference of the hub 104 so that they may occupy two alternative positions, Fig. 2. In one of said positions they will, at the turning of the hub, enter into engagement with a member which actuates the work piece in a manner so as to transmit same to the corresponding partition 102, 103 for faulty work pieces, while in the other position they pass this member without actuating the same otherwise than restoring it to its initial position. This member consists, for instance, of an arm 106 journalled on the shaft 13, which arm by means of a shoulder 107 secured thereto is brought to move by one of the above-mentioned teeth 105 when these are located in driving position. This movement, being smaller than one tooth pitch, i. e. in this case smaller than one-sixth revolution, is limited thereby that the teeth 105 upon the said movement are restored to their free wheel position by a cam 108 rigidly arranged outside the hub 104. By way of example, the arm 106 actuates a flap 109, Fig. 1, via a rod 110 and an arm 111, so that when the arm 106 has been taken along by a tooth 105, the work piece falls out in the partition 102 and 103 respectively. When the arm 106 during this operation has reached its turning position, a locking arm 111' swings down and locks the arm 106, but if the following tooth 105 is in free wheel position, this tooth will at the turning of the hub 104 immediately raise the locking arm 111' through striking against an abutment shoulder 112 located thereon, whereby the arm 106 is restored to its initial position by a spring 113, the return movement of the arm 106 being limited for instance thereby that the shoulder 107 located on the arm 106 strikes against the abutment shoulder on the locking arm 111'.

Fig. 7 shows that the arm 106 for a part of its movement has been taken along by one of the teeth 105. The counterpart to this position is the position of a faulty work piece 113' immediately before it is to be sorted out, but since the movable members of the machine are shown in the so-called gauging position, this as well as the work pieces in the measuring stations is in a position of rest. If it should be desired to have the work pieces marked when they are accepted, this marking is preferably carried out in this position thereby that a guide 114 or the like, on which a suitable marking device 115 is provided, is pressed down against a cam disc 119 or the like by a spring 116 so as to impart a movement to the marking device in direction downward against the work piece when this is located in the aforesaid position. If the work piece is faulty, the moving of the marking device is prevented by a (arch-shaped) portion 120 on the arm 106 which in the aforesaid position engages the bottom face of a shoulder 121 rigidly mounted on the guide 114. This (arch-shaped) portion 120 is adapted so as to also bar the movement of the guide 114 when the arm 106 remains in its turning position in cases when also the next work piece is faulty. When the tooth 105 takes along the arm 106 to the shown barred position, the flap 109 is not actuated, as the connection between the arm 106 and the pull rod 110 has a corresponding play not shown, but when the tooth 105 after the resting position of the work piece and the hub 104 continues its movement, also the flap 109 is taken along, an accelerated initial speed being obtained thereby that the hub is driven by a star wheel mechanism.

As the work pieces are separated in several categories, the sorting means must be so constructed, that if a work piece has a fault falling under one category and also a fault falling under another category, one of these categories has the precedence, i. e. the work piece goes to this category. This is effected as, by way of example, in the machine shown, wherein the (undermost) chute 103 has the precedence because, when the flap of same opens, the flap 109 closes the (middle) chute 102 as well as the (uppermost) chute 101.

The transmission of the teeth 105 to driving position is effected by means of electromagnets 126, which are actuated by the current impulse obtained when a faulty work piece is located in measuring position. Each sorting mechanism is provided with four such electromagnets, the number of which is like the maximum number of measuring stations connectable in the machine shown. The electromagnets 126 are rigidly mounted about the hub 104 and have a uniform mutual pitch, said pitch being the same as for the teeth 105, i. e. in this case one-sixth of the periphery. Besides, they are so positioned in angular relation to the tooth 15 which is located right in front of the arm 106 as are the measuring stations in relation to the sorting station in respect of the longitudinal pitch of the conveyor chain 5 between its carriers 31. Because all gauge contacts for a station and the category in question are connected to the corresponding electromagnets, the corresponding tooth 105 will be transmitted to driving position if a gauge contact closes the current, but the tooth 105 in question will not actuate the sorting mechanism until the corresponding work piece reaches the sorting position, since the hub 104 turns a pitch for each pitch the conveyor chain 5 is driven by the star wheel mechanism.

Figure 8:
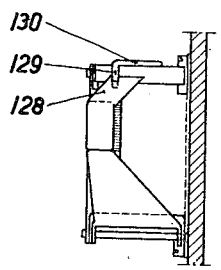
Figs. 8 and 9 are details of the sorting station.
Figure 9:
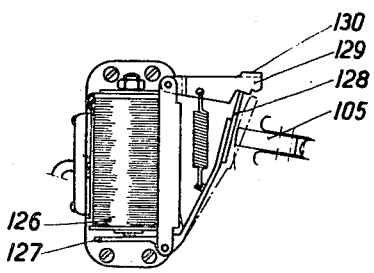

The transmission to driving position of the tooth 105 by the electromagnet 126 takes place for instance as shown in Figs. 8, 9 through the action of the electromagnet on a turnable, spring-actuated armature 127 provided with an arm 128 which in actuated position is locked by a spring-actuated latch 129. The arm 128 is so adapted that, in the locked position thereof, it forces the tooth 105 over to its driving end at the turning of the hub 104. The armature 127 together with the arm 128 then returns to its initial position thereby that the tooth 105 lifts the latch through striking against a tongue 130 located on the latch 129. Through this arrangement the least possible force and movement is spent on the armature, and thus the amperage needed for the electromagnet will also be the smallest possible one, which is of importance for the different contact members of the machine.

*Electrical contact device*

The contact device which registers the result of each gauging, i. e. closes an electrical circuit when the dimension in question exceeds the tolerance limits, consists of a casing 141, Fig. 10, wherein an arm 142 is turnably journalled, one end 143 of which is protruding outside the casing while the other end 144 is adapted to press against a contact arm 145 turnably journalled in the casing 141, the end of said contact arm which is provided with a contact pin 146 being swingable between two contacts 148, 149 settable and isolated by means of screws 147, which contacts are kept pressed against the said set screws 147 by a spring 150. The contact arm 145 is actuated by a spring 151 which strives to turn the contact arm towards the one contact 148, while the arm 142 is actuated by a spring 152 which is so much more powerful that it, since the arm 142 rests against the contact arm 145, turns the latter towards the other contact 149.

When the arm portion 143, which is located outside the casing 141, through striking against that side towards which the spring 152 exerts a turning moment is actuated by the movable member 153 transmitting the impact of the measuring body against the surface of the work piece to be measured, the contact arm 145 occupies that position relatively the contacts 148 and 149 which corresponds to the dimension of the work piece when same falls within the tolerance limits, whereas in case the dimension exceeds the tolerance limits, the contact arm 145 strikes against that contact 148 or 149 which corresponds to the exceeded tolerance limit (maximum or minimum), a play at the same time arising either between the arm portion 144 and the contact arm 145, when contact is made at the contact 148, or otherwise between the arm portion 143 and the movable member 153, when contact is made at the contact 149.

This arm and spring system thus results in an enlarged deviation on the movement of the contact arm, whereby a suitable voltage may be chosen without sparking reducing the exactness of measuring, in an elimination or reduction of the effect which the bearing play exerts on the exactness of measuring, in that the gauging member 153 may move beyond the tolerance limits without influencing on the contact pressure or causing an overload, and in that the (approximate) position of the dimension relatively the tolerance limits may be observed because the casing is provided with a window 154, which facilitates inspection as well as setting of the contacts 148 and 149 in accordance with the prototypes of measure which correspond to the tolerance limits and which are placed in the machine instead of the work piece when the tolerance limits are to be set. In doing so, the exact setting is established through electrical indication. For fixing the indicator in the respective gauging device, the casing 141 is provided with fixing means 155, which is given a form fitting the gauging device wherein it is to be fixed.

*Device for internal measuring*

The device for internal measuring, i. e. the member intended for measuring internal diameters, depth and length etc., is fixed to the slide 57 in an appropriate way. Fig. 11 shows such a device, universally arranged for measuring at a maximum six dimensions, and the fixing end of the special gauges or plug gauges which are shaped in accordance with the work piece. It consists of a body 161 or the like, in which a piston 162 is displaceably journalled. One end 163 of said piston is connected with that arm 61 which transmits the so-called secondary movement from the driving means of the measuring unit, when such a one is needed. In said piston, smaller pistons (six in number) 164 or the like are semi-circularly distributed and displaceably journalled in axial direction relatively the piston 162, the centre line of which is displaced relatively a hole 165 located in the fore part of the body, the special gauges being fixed in the said hole. On account of the said centre displacement, Fig. 12, the pistons 164 will be helically positioned relatively the said hole centre, whereby shoulders 166 on the displaceable pressure transmiters (sleeves) 167 of the plug gauge for the movable gauging bodies of the plug gauge through a turning of the plug gauge may be brought in engagement with the front ends of the respective pistons 164, said front ends being made with corresponding recesses, the contact surfaces of which are at right angles to the longitudinal axis of the pistons. Thus, the special plug gauges may easily be removed, and mounted respectively, when this be needed for replacement or overhaul. The pistons 164 are kept pressed forwardly relatively the piston 162 by springs 168, the power of which is adapted for the measuring pressure desirable for transmission via the pressure transmitters 167 to the movable measuring bodies of the plug gauge, when the piston 162 is pushed forward (to the right) i. e. when the measurement proper takes place, but each of the pistons 164 stops in the position which corresponds to the dimension of the work piece for the respective place of measuring. When the piston 162 after the measuring returns (to the left), also the pistons 164 and the measuring members (sleeves) 167 are withdrawn thereby that the pistons 164 are provided with a check nut 169 or the like which strikes against the piston 162. The measuring deviations of the pistons 164 are registered by the contact device 141, which is setably fixed in the body 161 and the arm 143 of which strikes against a recess 170 or a shoulder on the respective piston 164.

In the cases of measurement, Fig. 15, when the plug gauge is provided with measuring bodies corresponding to the minimum dimensions of the hole, which the respective measuring body shall be able to enter when having the accepted dimension, but cannot enter if the hole is smaller than this minimum dimension, the measuring body and the pressure transmitter (sleeve) acting on same must be allowed a recoiling movement relatively the measuring device, corresponding to the depth of the hole, in order that the whole measuring device shall not be forced to stop when it is about to advance to measuring position. If the recoiling movement needed is larger than allowed in the measuring device described above, the said piston 162 with co-operating details is removed and the body 161 only is used as mounting for the plug gauge and the contacting means as shown in Fig. 13. In this case, the plug gauge is so adapted that the shoulders 166 of the pressure transmitters (sleeves) 167 in the measuring position are resting directly against the respective arm 143 of the measuring contacts, but separate from same in case of recoil. The necessary measuring pressure on each pressure transmitter (sleeve) 167 is suitably obtained by means of springs 187 inserted in the plug gauge proper, as shown in Fig. 15.

*Plug gauges*

The part of the plug gauges which during the measurement is pushed into the hole to be measured of the work piece must, due to the restricted room at multi-dimensional measuring, be adapted to suit the work piece and the measures which with regard to the room can be measured in the respective station and the manner which should be preferred for the respective measurement in consideration of the exactness of the measures and the character of the surfaces. Thus, different measuring methods for different measures may be combined in one plug gauge, at the same time as certain measurements of a certain surface (f. inst. cylinder or thread) may be effected in one plug gauge and the other in one or several other plug gauges.

Figs. 14, 15, 16 and 17 are showing, by way of example, some plug gauges wherein different measuring methods have been adapted. The different measuring methods disregarded, the plug gauges are, as for instance in Fig. 14, characterized by a plug or guide sleeve 176, one end 177 of which is appropriately adapted to be fixed in a carrier or the like, while in other respects being adapted to carry and guide a number of measuring bodies 178—183 which are actuating or being actuated by pressure transmitters axially displaceable in said guide sleeve 176, for instance pressure sleeves 184 (167) or pressure rods 185, the ends of which protruding outside the mounting end 177 of the guide sleeve 176 are adapted with helicoidally positioned shoulders 186 (166) or recesses, Fig. 18, so that each pressure sleeve or pressure rod may be connected to the member which during the measurement registers the measures of the work piece and so that the pressure needed for pressing the measuring bodies against the work piece is effected either by means of springs 187 placed in the plug gauge, as shown in Fig. 15, or outside same, Figs. 14 and 11, the said spring power being transmitted through the pressure transmitters 184 or 185. Further features are that the different measuring bodies are arranged in a manner to obtain a certain "floating" without influencing on the measurement, i. e. that the measurement is not made dependent of an exact centering between the plug gauge and the work piece, and that, when measuring depths and diameters with so-called fixed measuring bodies, these are adapted with contact shoulders 188 or edges, Figs. 21, 23, lying in the same plane, whereby a certain inclination of the work piece may be allowed with respect to this plane without neglecting the exactness of measurement. This inclination is of importance when the work piece during the measuring is placed in V-shaped blocks, in which case a certain inclination arises on account of the fact that the diameters of the work piece on the block are deviating differently from the normal diameters, however without exceeding the tolerances of manufacture.

From Fig. 19 appears that for a small angle A1 becomes practically equal to A2, which is the case when stop edges are used, whereas B will be greater than A1 when plane contact is in question.

With regard to the different measuring methods, Fig. 14 shows a plug gauge capable of carrying out six different measurements. The diameter $a$ is measured with a measuring body 178, the outer shell of which consists of either two cylindrical parts, each one at the front provided with a bevel (and a clearance groove between the cylindrical parts when deeper holes are to be measured), or two spherical parts (or combination of cylindrical and spherical parts), the front part in both cases corresponding to the maximum measure of the hole, so that when the measuring body is pushed into the hole, the front part goes in but not the rear one if the hole keeps the tolerance limits. If the hole is smaller than the minimum limit, the fore part will not go in, and if it exceeds the maximum limit, also the rear part will pass in. At the application of this method it is thus necessary that the hole is open at the bottom or provided with clearance or the like so as to let the front end pass freely, as also the rear end shall be able to pass into holes exceeding the maximum limit. The measuring body 178 is in appropriate manner connected with the corresponding pressure transmitter 185 so that a certain radial play 189 arises between the measuring body and the pressure rod, whereby the necessary "floating" is obtained.

When the hole at the inner end is not open or provided with clearance or hollow moulding, but is sharply demarcated as the hole $b$, it cannot be measured with a combined maximum/minimum gauge. Therefore, the maximum and minimum limits must be measured individually, the minimum limits being measured as illustrated in Fig. 15. The measuring body 190, the diameter of which corresponds to the minimum diameter of the hole, is at the front end provided with an entering bevel 194 which is largest on the lower side and decreases upwards so that the upper side will correspond completely to the shape of the hole. The measuring body 190 is connected with the corresponding pressure transmitter, i. e. pressure rod 185 or pressure sleeve 184 in a suitable way so as to give rise to a certain radial play 189 between the measuring body and the pressure sleeve or rod, whereby the necessary "floating" is obtained, and the measuring body is provided with a pin 195 or the like, which with allowance for a small play fits into a corresponding recess in the pressure rod in order to prevent the measuring body from turning. Because the measuring body on account of the play 189 prior to being pushed into the hole $b$ will be located somewhat lower than same, whereas the front of the measuring body thanks to the entering bevel 194 is positioned within the diameter of the hole, the measuring body is at the insertion catched by the outer edge of the hole even if the centre position of the hole should vary somewhat.

The maximum diameter of the hole $b$ is gauged for instance with a measuring body 179, as shown in Fig. 14, the outer shell of which consists of a spherical or cylindrical surface provided with an entering bevel at the front thereof. The outer diameter corresponds to the maximum diameter of the hole, for which reason the measuring body will stop if the diameter of the hole is of accepted size, in which case the said diameter will reach the outer edge of the hole at the insertion of the measuring body, but passes into the hole if this exceeds the tolerance limit. This measuring body is "floatingly" connected with the corresponding pressure sleeve 184 like the measuring bodies mentioned above.

When holes $c$ are concerned, the outer edge and/or the inner end of which are bevelled or rounded, the front end of the corresponding minimum gauge 191 may be given a shape corresponding to the minimum measures of the inner end of the hole. In these cases, consequently, it is not necessary to provide the measuring body with any special entering bevel, but only to connect it "floatingly" with the corresponding pressure transmitter 184 or 185.

In the measuring methods described above, the tolerance limits of the diameters of the hole are thus determined through the outer diameter of the respective measuring bodies, for which reason the tolerances registered on the maximum/minimum indicators will be the tolerances on the depth dimension of the hole and not the diameter tolerances, and therefore the diameters as well as the depth of the holes are gauged simultaneously. In case the hole is too deep, but the diameter is below the minimum limit, the minimum gauge thus will not pass into the hole, and as a consequence the work piece is discharged as correctable, while it should be discharged as cancelled because the hole is too deep. If it is desirable to prevent such events, the measurement of depths may be effected separately with a measuring body having a diameter so much below the minimum limit as may reasonably be anticipated. Fig. 15 shows as an example for the diameter $d$ the application of this measuring method for measurement of depths, a cylindrical measuring body 193 with an outer diameter smaller than the minimum dimensions of the corresponding diameter of the hole being rigidly connected with the corresponding pressure transmitter 184, while the possible inclination of the work piece is compensated by the frontside of the measuring body being provided with shoulders 188 disposed in the horizontal plane, as shown in Fig. 2.

The described methods for tolerance gauging of hole-diameters are particularly suited for small diameters, and when larger diameters are concerned, they are preferably replaced by methods in which a conical body through axial displacement pushes a number of radially displaceable balls, pistons or jaws outwards toward the surface to be measured. The necessary "floating" is in this case obtained through permitting the conical body 196 and its basic plane a certain radial play 189. Fig. 14 illustrates as an example the measurement of particularly the maximum measure of the diameter $c$ (the minimum dimension of which is gauged with a minimum gauge according to Fig. 15 as described above) by means of balls 180, the balls, at least three in number, being guided by cylindrical holes radially disposed in the sleeve 176, the outer edge of said holes being partly covered by a sleeve or springy ring 197 which has for its purpose to prevent the balls from falling out when no measurement takes place.

Fig. 14 shows the measurement of by way of example, the inner diameter of threads with the aid of radially movable pistons 181, the ends of which resting against the thread are cylindrically shaped, while the ends contacting the conical body 196 are adapted with the same angle of inclination as the cone. The pistons, at least three in number, are guided by holes radially disposed in the sleeve 176 and are prevented from turning by a springy ring 198 radially guided in a groove around the sleeve, said springy ring resting against a recess located in the outer end of the piston 181 and pressing the pistons inwards when the pressure sleeve 184 returns after the measuring operation.

When two diameters located near each other are to be measured in the same gauge, the measuring movement for the one diameter d, Fig. 14, must be transmitted by means of arms 182, articulatedly or resiliently journalled in the guide sleeve 176 and actuated by an axially displaceable and radially "floating" cone body 196 via radially movable balls or pistons 200 in conformity with the last mentioned case.

Measurement of conical surfaces on the work piece may be carried out either by means of a measuring body 192, Fig. 15, adapted so that the measurement is done in similarity with measurement of depths, the said measuring body being "floatingly" connected with the corresponding pressure sleeve 184 so that contact with the conical part of the work piece is made around the front edge of the measuring body, or one or more diameter measurements may be carried out with the aid of movable balls, pistons or jaws in conformity with the measuring methods described for cylindrical holes, the measuring taking place at a fixed distance from the basic plane of the cone or another plane at a right angle to the longitudinal axis of the cone, depending on the dimensions of the work piece.

Fig. 14 shows as an example that also external cones may be measured in a so-called internal gauge, preferably when the cone is adjacent the end plane. This measurement is carried out by means of arms 183 turnably journalled in the guide sleeve 176 and adapted to strike against the work piece and, in conformity with previously described diameter measurements, adapted to be actuated by a "floating" cone body 196 via radially movable pistons 200.

Measurement of threads is shown by way of example in Fig. 16. Apart from measuring the internal diameter as shown in Fig. 14, the mean diameter and the profile of the thread are measured with this gauge by means of three dies 206 which in axial direction are displaceably journalled in radially movable pistons 207 actuated by a "floating" cone body 196 and a pressure sleeve or pressure rod 185 as in the previously described diameter measurements. The dies 206 and the pistons 207, Fig. 22, are pressed inwards by one or more springy rings 208, the power of which is smaller than the spring power which via the pressure rod 185 and the cone body 196 presses the dies and the pistons outwards when measuring is carried out. As the dies 206 are axially displaceable, they can "float" into the thread independently of the axial initial position of the thread profile, for instance through a bevel 209 located in front of the threading die, and behind it respectively, said bevel being arranged so as to permit some play between the die and the thread, no matter how they are positioned relatively each other. If the thread profile has a plane top, the die is prevented from sliding down into the thread if the thread tops of the die are just coinciding with the tops of the thread, and for measurement of such threads, the gauge is therefore provided with a special mechanism which in said cases displaces the dies in axial direction by means of a momentary push. This mechanism consists for instance of a striking pin 210 acting upon each die, which pin by means of a ball 211 is actuated by a cam 212 or the like on a pressure sleeve 184, said sleeve in conformity with the pressure rod 185 being adapted to be actuated by a springy means located outside the gauge. The ball 211 is pressed against the cam 212, for instance by a spring actuated piston 213, so that in the cases when the die slides into the thread without coincidence of the tops, the piston 213 springs back when the cam 212 passes the ball. The piston 213 likewise springs back for the cam 212 when the pressure sleeve 184 after the measuring operation is withdrawn to its initial position for the following measuring operation. If the dies and the pistons should not return completely after the measuring because of defects in the work piece, the gauge would fasten and, when mechanically handled, cause a break down. In order to avoid this risk, the measuring pistons 207 are journalled in a body 214 which by means of springs 215 is kept pressed against and guided by a sleeve 176. In conformity with the previously described gauges, the said sleeve is adapted for fastening of the gauge and guiding of the pressure transmitters 185 and 184. The springs 215 and the body 214 are adapted to co-operate in such a manner that, when the body 214 as well as measuring pistons 207 and dies 206 fasten in the work piece, they separate from the rest of the gauge when this after the measuring is withdrawn with sufficient force. Then the two parts may be united again through being pressed together manually.

When measuring grooves, the diameter as well as the distance and minimum width of which is to be gauged, this is carried out, by way of example, in a plug gauge as shown in Fig. 17 (which shows certain resemblances with the gauge for measuring threads). Three dies 206', having shoulders 216 corresponding to the minimum width of the groove and protruding into the groove, are displaceably journalled in axial direction in radially movable pistons 207, which as in previously described diameter measurements are actuated by a "floating" cone body 196 and a pressure transmitter 184 or 185. The pistons 207 are pressed inwards by a springy ring 208 less powerful than the spring force which via the push rod 185 and the cone body 196 pushes the pistons 207 with the dies 206' outwards during measuring. The dies 206' are from one end actuated by a pressure transmitter 184 with the aid of pistons 217 and two washers 218, 219 disposed between the pistons 217 and the pressure transmitter, the washer 218 contacting the pressure transmitter being on both sides thereof provided with edges 188, Fig. 24, displaced a quarter of a turning relatively each other, whereby such influence on the depth measurement is eliminated, which is caused by possible inclination of the workpiece and the exactness of manufacture of the length dimensions of the pistons 217 and the dies 206. From the opposite direction the dies 206' are actuated by a spring 220 less powerful than the spring force actuating the pressure transmitter 184 at the measurement. Consequently, the die 206' will at the measurement move somewhat in axial direction, until it comes right in front of the groove, at which moment it is pressed out by the cone body 196, and after the measuring is finished, it returns to its initial position. The depth dimension measured in the present example begins at the bottom of the hole, and therefore the stop shoulders 188 of the plug gauge are disposed on the end surface of the plug gauge. If the dies and pistons should not return completely after the measurement, the plug gauge would fasten, and for that reason this plug gauge is made divisible like the one used for measuring threads, consequently, in addition to the said parts, comprising a body 214 and a guide sleeve 176 as well as preferably three springs 215 which are keeping the body 214 pressed against the guide sleeve 176, so that the plug gauge in said case divides up without suffering any damage, whereupon it may be manually re-assembled. When using such plug gauges for mechanical measurement, they may be equipped with an electrical signal device which immediately gives a signal, or/and stops the machine.

The plug gauge structure above described for measuring internal diameters is claimed in a divisional application, Serial No. 249,054, now Patent 2,668,361, filed October 1, 1951.

*Universal measuring device for outer lengths*

The device, Figs. 25-29, with which external length dimensions, distances, groove widths and flange thicknesses may be measured, consists of a body 226 which with a part 227 thereof is adapted to be fastened on vertically movable guides 73 of the machine and the rest of which is (semi-circularly) adapted for journalling of a number of rods 228, movable axially and parallelly to the longitudinal axis of the work piece, and each of them, by way of example through an arm 229, being actuated in the one or the other direction by means of springs 231 reversible through a fitting 230 and in the opposite direction for instance via a wedge-shaped shoulder 232 actuated by a pin 233 with two alternative positions fixed in a slide 234, which is connected with the movable member 74 in order to obtain a so-called secondary motion in the measuring device. A number of the rods 228 are provided with electrical contact means 141, while the other rods 228 are provided with arms 235 for actuating one or more electrical contact devices (however in such a manner that no contact device can be actuated by more than one arm), whereby the axial position between the rods is indicated. Settable jaws 236 are secured to the rods 228 by means of carriers 237, according to the form of the work piece and the dimensions to be gauged, the necessary measuring pressure being effected by the springs 231, the motion of the dies (perpendicular) to and from the measuring surface being determined by the motion of the slide 234. In order that the jaws 236, when the measuring device during its primary motion moves down toward the work piece, shall not strike against such envelope surfaces of the work piece which are located adjacent to the surfaces to be measured, which would prevent the jaws from striking against the surfaces to be measured at the so-called secondary motion, the jaws 236 are so mounted in the carriers 237 that they are permitted a certain resilient motion parallel to the surface to be measured, and this is obtained for instance through journalling the jaws 236, Fig. 29, displaceably in the holes 237 at right angles to the rods 228 and pressing them against the envelope surface by means of a spring 238 which engages a notch 239 in the jaw. By providing the jaw with a plurality of such notches 239 along the length thereof, it also becomes possible to set the jaw 236 relatively the envelope surfaces of the work piece. Furthermore, if the surfaces to be measured of the work piece exceed the tolerance range by such an amount that the jaws at the primary motion of the measuring device would strike against the edges of the surfaces to be measured instead of passing same, this spring device causes the jaws 236 to glide away instead of causing a break down.

If several dimensions initiate from the same surface, it will not be necessary to arrange the rods in pairs in the measuring device described, which arrangement would involve that several jaws would contact the common surface. Instead, there is for this surface fixed a jaw on a rod 228 provided with a measuring arm 235, while the other jaws for these measures are fastened on rods 228 provided with electrical contact means which are actuated by the said measuring arm 229. (Fig. 27 shows the rods arranged in three groups, each group comprising three rods, two of them having contact means and one rod having an arm 229 acting upon said contact means, whereby two dimensions from one and the same surface may be measured per group.)

The gauge structure above described and shown in Figs. 25-29 is claimed in a divisional application, Serial No. 249,053, filed October 1, 1951.

*Universal measuring device for outer diameters*

For measuring external diameters in the usual way, i. e. through diametrical two point measurement, there is used a device comprising a number of electrically registering measuring vices according to Fig. 30, carried by a frame 241 which is fixed on the verticaly movable guides of the machine, Figs. 31, 32.

Each measuring vice consists of a body 242 articulatedly mounted by means of a bushing 243, which is fixed on a shaft 244 common for all the measuring vices and parallel to the longitudinal axis of the work piece. A measuring jaw 245 is settably mounted at the lower part of the body 242, while a measuring jaw 246 acting against same is settably mounted on a slide 247 disposed in the body 242, said slide being actuated by a spring 248 which causes the necessary measuring pressure between the jaws 245, 246 and the work piece.

The contact device closing an electrical circuit when the diameter in question exceeds the tolerance limits, is on the whole like the electrical contact device described, but is in this case built together with the measuring vice and consists of a portion 249 adapted as a casing in the body 242, in which portion an arm 250 is turnably journalled, one end 251 thereof being actuated by the slide 247, while the other end 144 acts upon a contact arm 145 turnably journalled in the casing 249, the end of which contact arm, provided with a contact pin 146, may swing between two contacts 148, 149, settable and isolated by means of screws 147. Said contacts are kept pressed against said set screws 147 by means of a spring 150. The contact arm 145 is actuated by a spring 151 which strives to turn the contact arm in the opposite direction against the effect of the spring 248 through the slide 247 and the arm 250. Because the spring 248 is more powerful than the spring 151 the first mentioned will, besides effecting the measuring pressure against the work piece, actuate the contact arm 145 so that this will occupy a position relatively the contacts 148, 149 corresponding to the dimensions of the work piece relatively the tolerance limits. In conformity with the previously described contact device, this measuring vice is provided with a window 154, through which the position of the contact arm relatively the contacts 148, 149 can be directly observed.

To prevent the measuring jaws from gliding against the work piece at the primary motion of the measuring device, this is provided with a mechanism which closes, and opens respectively, the jaws before the measuring operation, and afterwards respectively. This mechanism consists of an arm 252, turnably journalled in the body 242, which with one end thereof acts on the slide 247 and through the other end is actuated by a piston 253 protruding through the body wall. On the pistons 253 of all measuring vices there is pressing a bar 254, which via for instance a slide 255 in the frame 241, Fig. 31, is connected with the movable member 74 of the machine for the purpose of obtaining the so-called secondary motion in the measuring device. Hereby is obtained the motion of the jaw 246 on the slide 247 relatively the work piece, while the motion of the jaw 245 positioned on the body 242 is obtained thereby that the piston 253 at the same time, through the journalling of the arm 252 in the body, transmits a turning moment to the body 242, the turning motion of the body 242 being limited by a set screw 256 which strikes against a plane on the bushing 243. Through setting the screw 256 there is thus obtained a play between the two jaws and the work piece when no measuring takes place.

Having now described our invention, what we claim as new and desire to secure by Letters Patent is:

1. A machine for gauging and sorting work pieces comprising a row of measuring stations arranged in spaced sequential relation, a gauge at each said measuring station for gauging a different dimension of said work piece, each said gauge including electrical contact means having a movable control member therefor whose displacement is proportional to the measuring stroke of said gauge; an endless conveyor having spaced work supporting means thereon adapted to transport said work pieces to be gauged past said measuring stations; driving means for said machine including means imparting an intermittent motion to said conveyor establishing a dwell period for each work supporting means at each said measuring station and means actuating the gauges at said measuring stations during the said dwell period; and a sorting station at the end of said row of measuring stations, said sorting station comprising a shaft having an intermittent rotary motion synchronized with the intermittent movement of said conveyor, a disc secured upon said shaft, a plurality of driver teeth arranged on said disc in spaced relation about said shaft, a plurality of electromagnets arranged in spaced relation about said disc for selectively actuating the driver teeth to a sorting position, said electromagnets corresponding in number with the number of measuring stations and adapted to be energized respectively upon closure of the electrical contact means at the associated measuring station thereby to actuate the corresponding positioned driver tooth on said disc, and a sorting device common to all driver teeth on said disc including operating means therefor disposed in the path of said driver teeth and actuated by the latter when in said sorting position.

2. A gauging and sorting machine as defined in claim 1 wherein said sorting device is constituted by a flap adapted to lead the work pieces to different sorting positions, said flap being controlled by an arm journalled on said shaft and which arm is engaged by said driver teeth when in said sorting position.

3. A gauging and sorting machine as defined in claim 1 wherein said sorting device includes an arm journalled upon said shaft and which is engaged by said driver teeth when in said sorting position, and which further includes a marking device at said sorting station, and a lockout actuated by said arm to render said marking device inoperable.

4. An automatic gauging and sorting machine as defined in claim 1 wherein each said measuring station includes a gauge carrier slidable horizontally to and from gauging position, a cam disc fixed on a shaft rotated by said driving means, a pivoted cam follower lever, a spring biasing said lever into contact with said cam disc, and means including a spring connecting said lever with said gauge carrier, the force of last said spring being counter to but less than the force exerted by said biasing spring.

5. A machine as defined in claim 4 wherein the means connecting said lever and gauge carrier includes a screw acting as a piston.

6. A machine as defined in claim 4 wherein each of said measuring stations further includes vertical tubular guides, a frame carried by and slidable with said guides, a slide having a lost motion connection with said frame, a cam disc secured to said shaft and engaging said slide for reciprocating the latter and said frame, rods within said guides movable axially thereof, and linkage means connecting said rods to said slide for imparting vertical reciprocating motion to said rods.

7. A machine as defined in claim 4 wherein each said measuring station includes a block disposed beneath said conveyor, said block being spring loaded in an upward direction to transfer work pieces thereto from said work supporting means, a stop limiting upward travel of said block, and means actuated in timed relation with travel of said conveyor for periodically lowering said block.

8. A machine as defined in claim 4 and which further includes central contact means actuated in timed relation with the travel of said carrier for interrupting the control circuit through said gauge contact means as said carrier moves away from its gauging position.

9. An automatic gauging and sorting machine as defined in claim 1 wherein each said measuring station includes a block disposed beneath said conveyor and movable vertically to transfer work pieces thereto from said work supporting means and lift said pieces into gauging position, and means actuated in timed relation with the travel of said conveyor for periodically actuating said block.

10. An automatic gauging and sorting machine as defined in claim 1 wherein each said measuring station includes a block disposed beneath said conveyor, said block being spring loaded in an upward direction to transfer work pieces thereto from said work supporting means, a stop limiting upward travel of said block, and means actuated in timed relation with the travel of said conveyor for periodically lowering said block.

11. A machine for gauging and sorting work pieces comprising a row of measuring stations arranged in spaced sequential relation, a gauge at each said measuring station for gauging a different dimension of said work piece, each said gauge including electrical contact means having a movable control member therefor whose displacement is proportional to the measuring stroke of said gauge; an endless conveyor having spaced work supporting means thereon adapted to transport said work pieces to be gauged past said measuring stations; driving means for said machine including means imparting an intermittent motion to said conveyor establishing a dwell period for each work supporting means at each said measuring station and means actuating the gauges at said measuring stations during the said dwell period; and a sorting station at the end of said row of measuring stations, said sorting station comprising a shaft having an intermittent rotary motion synchronized with the intermittent movement of said conveyor, a pair of discs, secured upon said shaft, a plurality of driver teeth arranged on each said disc in spaced relation about said shaft, a plurality of electromagnets arranged in spaced relation about each said disc for selectively actuating the driver teeth thereof to a sorting position, said electromagnets corresponding in number with the number of measuring stations and adapted to be energized respectively upon closure of the electrical contact means at the associated measuring station, a sorting device individual to each disc including operating means therefor disposed in the path of said driver teeth of the respective discs and actuated by the teeth when in said sorting position and means interlinking the respective operating means of said sorting devices such that actuation of the operating means for one of the sorting devices results in actuation of the operating means of the other sorting device.

References Cited in the file of this patent

UNITED STATES PATENTS

| Number | Name | Date |
|---|---|---|
| 1,309,086 | Danner | July 8, 1919 |
| 1,377,959 | Bjorkman | May 10, 1921 |
| 1,451,736 | Lauer | Apr. 17, 1923 |
| 1,511,934 | Bath | Oct. 14, 1924 |
| 1,580,955 | Burdick | Apr. 13, 1926 |
| 1,586,156 | Keller | May 25, 1926 |
| 1,959,867 | Lafferty | May 22, 1934 |
| 2,138,645 | Rey | Nov. 29, 1938 |
| 2,186,693 | Bradbury | Jan. 9, 1940 |
| 2,375,385 | Rasmussen | May 8, 1945 |
| 2,384,518 | Aller | Sept. 11, 1945 |
| 2,400,507 | Henszey | May 21, 1946 |
| 2,434,535 | Anders | Jan. 13, 1948 |

FOREIGN PATENTS

| Number | Country | Date |
|---|---|---|
| 113,536 | Great Britain | Feb. 28, 1918 |